Oct. 10, 1967    R. W. RICHMAN    3,346,268

VEHICLE WITH CLIMBING WHEELS

Filed Aug. 27, 1965    6 Sheets-Sheet 1

INVENTOR.
ROBERT W. RICHMAN
BY
ATTYS.

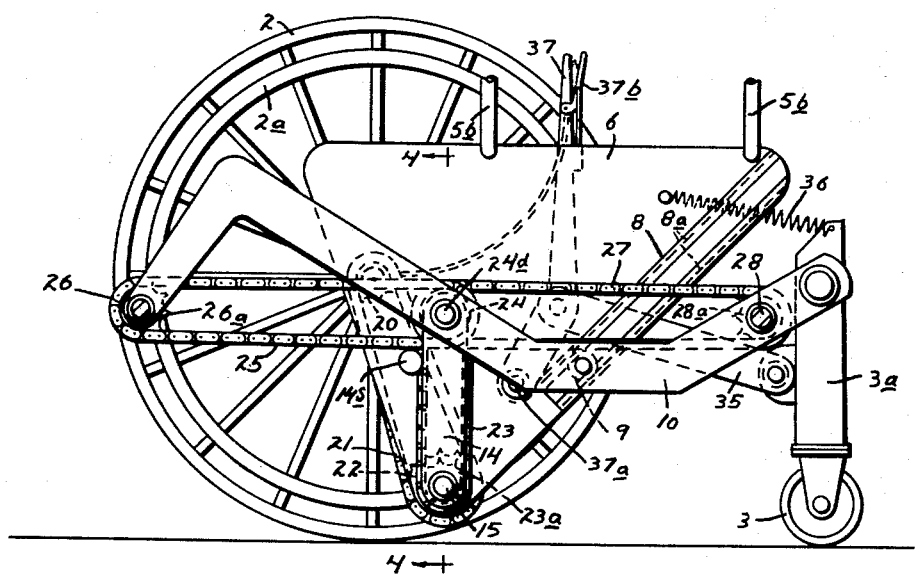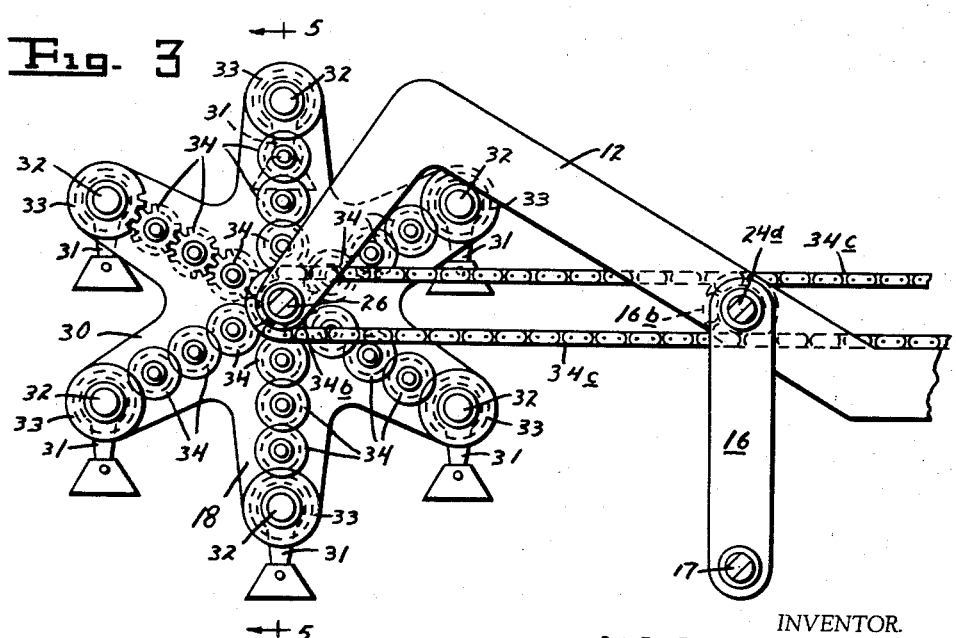

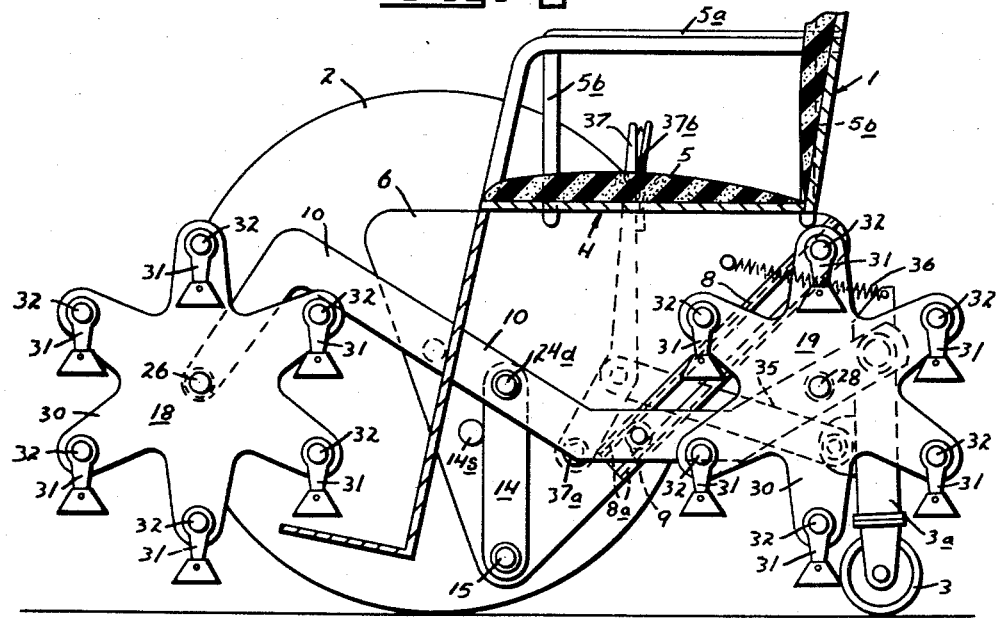
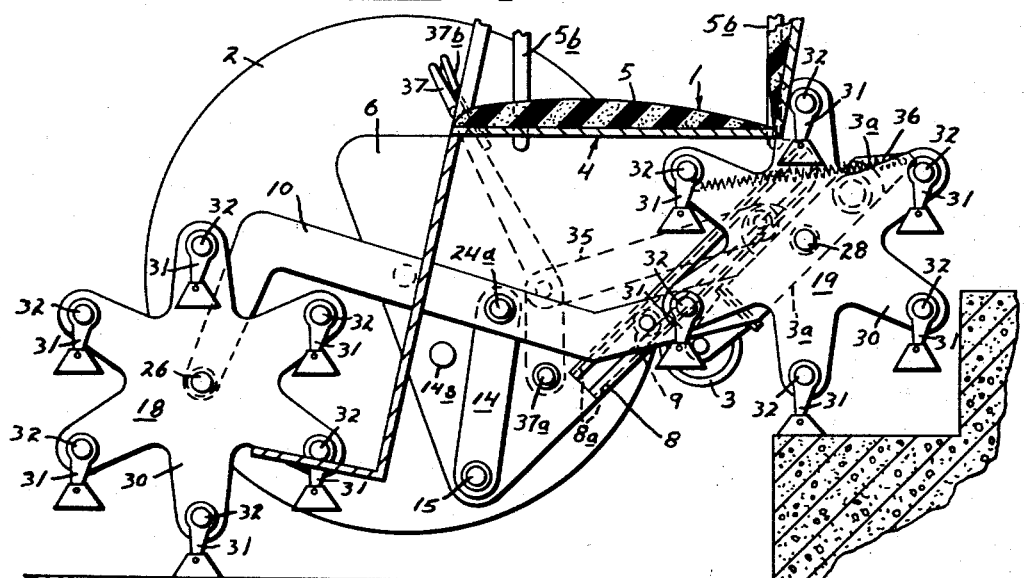

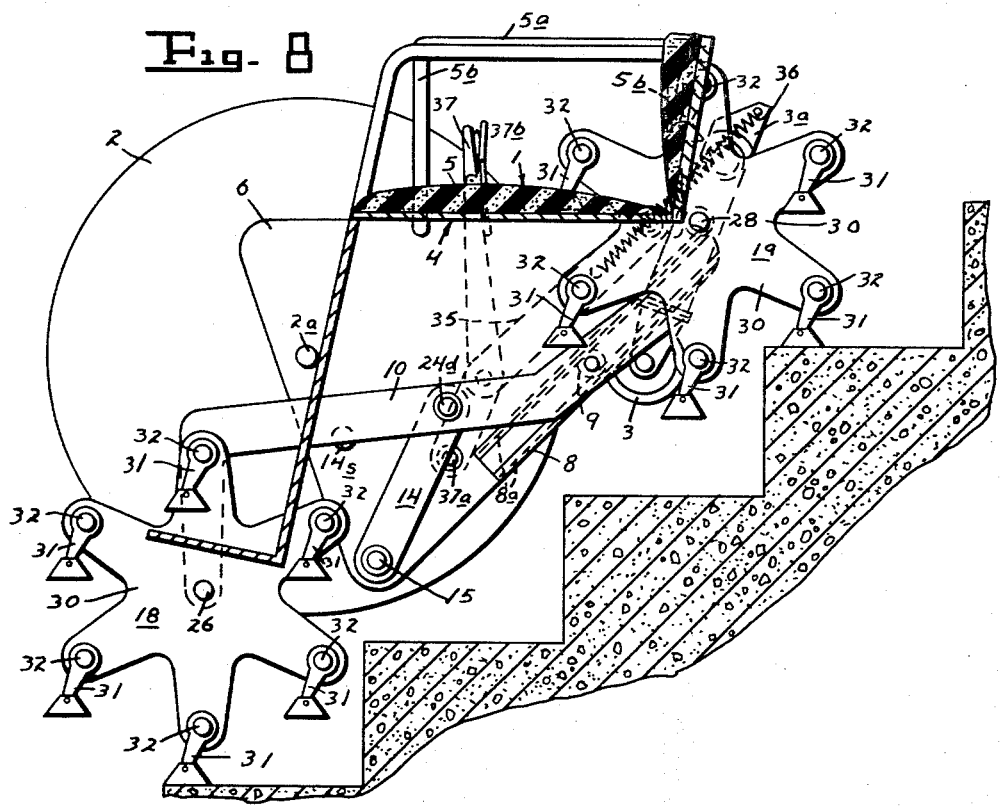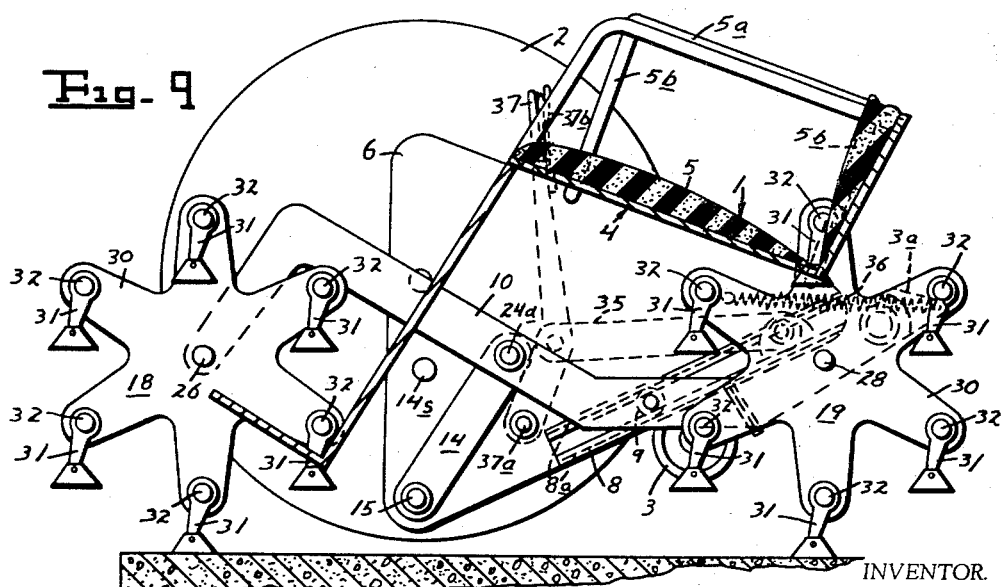

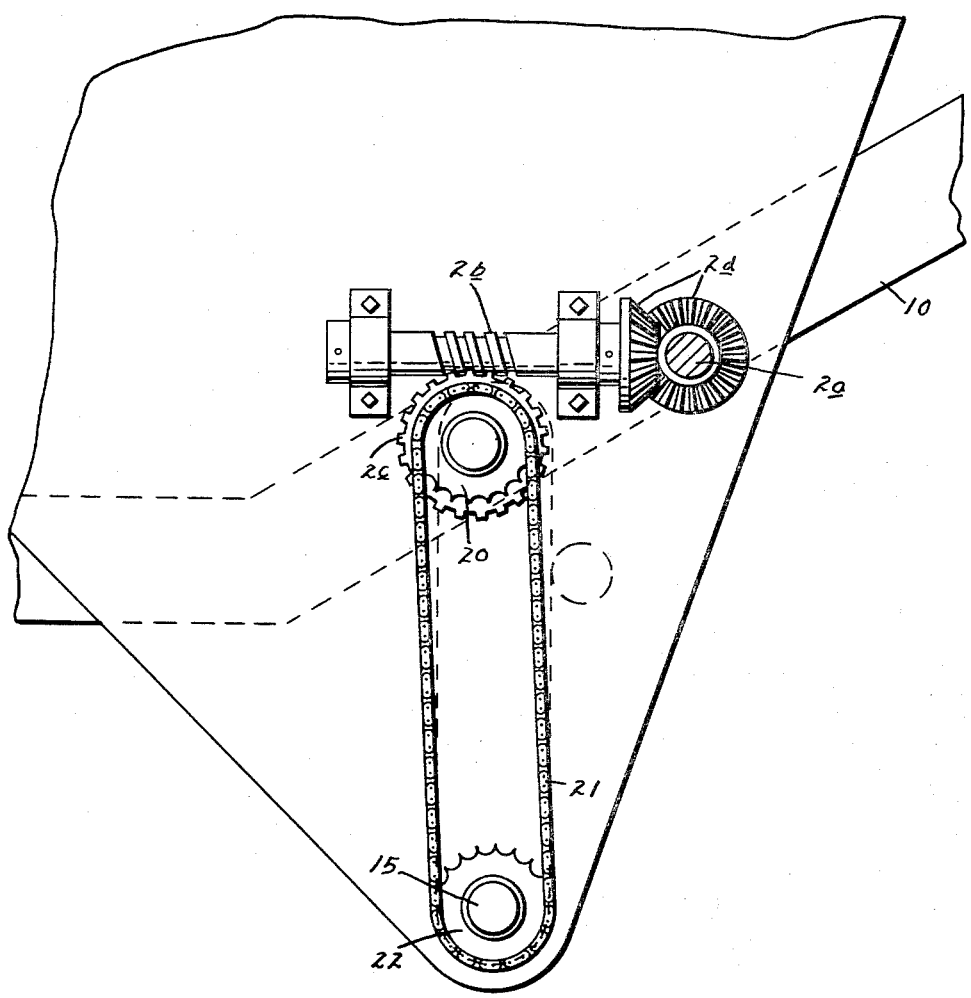

INVENTOR.
ROBERT W. RICHMAN
BY Wells & St. John
ATTYS.

United States Patent Office 3,346,268
Patented Oct. 10, 1967

3,346,268
VEHICLE WITH CLIMBING WHEELS
Robert W. Richman, P.O. Box 143,
Moscow, Idaho 83843
Filed Aug. 27, 1965, Sr. No. 483,078
6 Claims. (Cl. 280—5.26)

ABSTRACT OF THE DISCLOSURE

The device disclosed is a vehicle with wheels to roll on level ground and with climbing feet which can be brought into use to climb up and down terraced inclines. The vehicle has a cab frame providing a support for a seat. This frame is supported by wheels which can be hand or power operated. A second frame at each side of the vehicle, referred to as a chassis frame, carries front and rear climbing wheels including step engaging feet to support the vehicle on steps. The device has connections between the cab frame and the chassis frame operable to raise and lower the chassis frame to bring either the cab frame wheels or the chassis frame wheels into support position. These connections include links connecting the cab frame with the chassis frames and a rail and roller arrangement at each side wherein the rail is on an incline on the cab frame from the lower end of the link rearwardly and the roller is on the chassis frame and spaced rearwardly from the link connection to the chassis frame.

---

My invention relates to the provision of a vehicle with wheels which will enable it to climb up and down terraced inclines, such as stairs, with safety. While it is shown in connection with an invalid chair, it is not limited to such use. It is the purpose of my invention to provide a wheel and frame assembly wherein the assembly includes wheel means normally supporting the vehicle for travel on level surfaces, a cab frame which serves as the support for a seat, or other load carrying platform and a chassis frame which includes forward and rear climbing wheels, normally suspended when the wheel means is on level surface, and movable into surface engagement when the climbing wheels are needed to climb up or down a terraced incline.

It is also a purpose of my invention to provide a vehicle of this nature with coacting means between the cab frame and chassis frame whereby the cab frame is prevented from tipping forward when the chassis frame and its climbing wheels are positioned so that the front climbing wheel is at a lower level than the rear climbing wheels.

Other and more specific objects of the invention will appear from the following description and the accompanying drawings illustrating a preferred form of the invention. It should be understood, however, that the drawings and description are illustrative only and that various modifications of the details of construction may be made within the scope of the invention as defined in the claims.

In the drawings:

FIGURE 2 is a fragmentary sectional view taken on the line 2—2 of FIGURE 1, with certain parts left out for the sake of clarity;

FIGURE 3 is a fragmentary side view of a part of the chassis frame showing the gearing used to control the feet on the climbing wheels;

FIGURE 6 is a somewhat diagrammatic side view showing the relative positions of the cab frame, the chassis frame and the wheels when the device is on a level surface;

FIGURE 7 is a view like FIGURE 6, but showing the device starting to climb a flight of stairs;

FIGURE 8 is a view like FIGURE 6, but showing the device climbing stairs;

FIGURE 9 is a view like FIGURE 6, showing the device starting down a flight of stairs;

FIGURE 10 is an enlarged detail view illustrating a portion of the drive mechanism;

Figure 1:
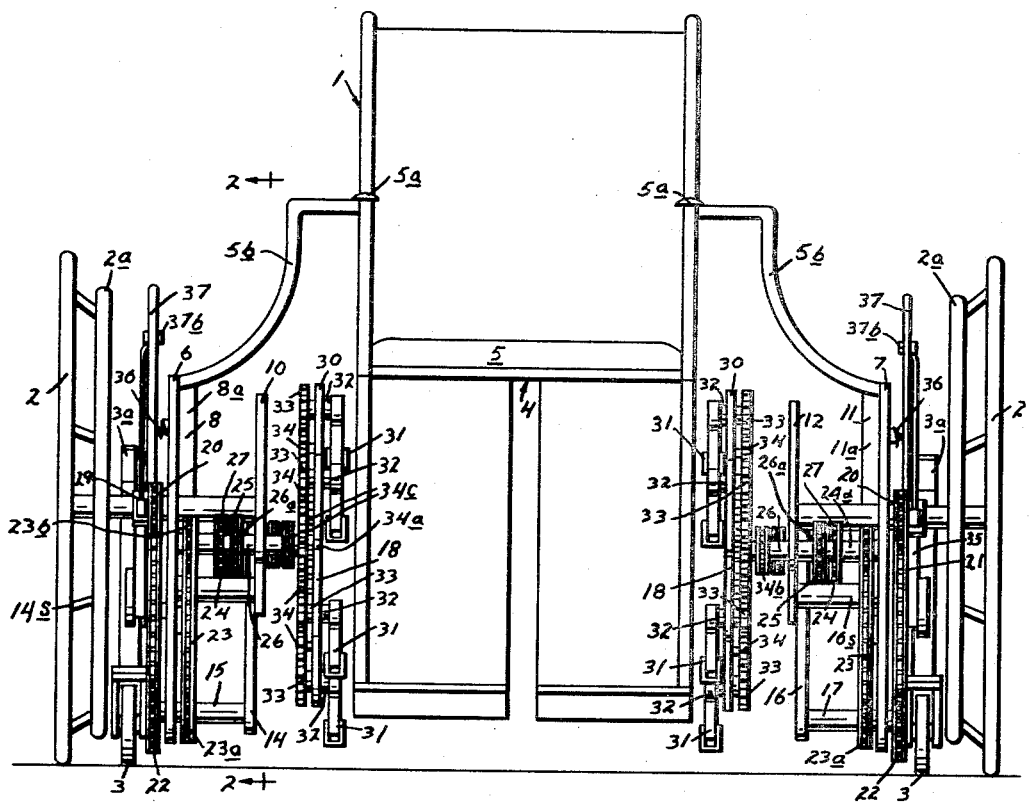
FIGURE 1 is a front view of an invalid wheel chair embodying my invention in which the driving connections, chains, etc. are spread out transversely of the chair to show them more clearly.

Referring now to the drawings, my invention is shown as embodied in a wheel chair 1 which has front wheels 2 of the type that have hand rails 2a which may be turned by the occupant of the chair to propel the chair. The chair also has rear caster wheels 3. The wheels 2 support the front end of a cab frame 4 which includes a seat 5 and integral arm rests 5a with outwardly directed supports 5b, extending between side frame members 6 and 7 and connecting them to complete the cab frame 4. The cab frame 4 is supported at the rear as follows.

The member 6 is provided with a rail 8 having channelled sides 8a for guiding a roller 9 that is mounted on a chassis frame member 10. The member 7 is provided with a rail 11 with channelled sides 11a which similarly guide a roller on a chassis frame member 12. These chassis frame members 10 and 12 are also provided with pivoted suspension bars or links 14 and 16, which are pivoted at their lower ends on shafts 15 and 17. These shafts 15 and 17 are journalled in the members 6 and 7 in front of the lower forward ends of the rails 8 and 11 respectively. Since the front portions of the members 6 and 7 have the wheels 2 mounted thereon, these wheels carry the front portions of the chassis frame members 10 and 12 through the links 14 and 16.

The wheels 3 are connected by stems 3a to the rear end portions of the chassis frame members 10 and 12 and serve normally to support these rear end portions. The rollers 9 and 13 serve to support the rear portions of the rails 8 and 11 of the cab frame members 6 and 7 at all times.

Each of the chassis frame members 10 and 12 has a climbing wheel 18 at its front end and a climbing wheel 19 at its rear end. These wheels will be described more fully hereinafter. The drive mechanism for these wheels is by worm and gear drives 2b–2c connecting shafts 2a of wheels 2 to sprocket wheels 20 mounted on the frame members 6 and 7 through chains 21 to sprocket wheels 22 on the shafts 15 and 17. Shaft 15 or 17 is connected by sprockets 23a, 23b and chain 23 to a double sprocket wheel unit 24 fixed upon a common shaft 24a which is journalled on the respective chassis frame member 10 or 12 on the same axis as the link 14 or 16 where it pivots to the chassis frame member 10 or 12 respectively. A sprocket chain 25 connects the sprocket wheel unit 24 to a sprocket wheel 26a on the drive shaft 26 of the front wheel 18 and a sprocket chain 27 connects the sprocket wheel unit 24 to a sprocket wheel 28a on the drive shaft 28 of the rear wheel 19 so that these climbing wheels are driven in unison. Since the power needed for controlling the climbing of the vehicle is much greater than that needed to propel it along the ground, the worm and gear drive 2b–2c and the sprocket wheels 20, 22, 24, 26a and 28a are so proportioned as to provide the desired speed reduction between the wheels 2 and the drive shafts 26 and 28. A clutch mechanism 29 is incorporated in each shaft 2a between the hub of wheel 2 and the gearing 2d for the worm and gear drive 2b–2c so that, when travelling on the level, the drive means for the climbing wheels 18 and 19 can be disconnected from the wheels 2. The worm and gear drive 2b–2c prevents the climbing wheels from rotating the wheels 2 because the worm gear cannot turn the worm.

Figure 5:
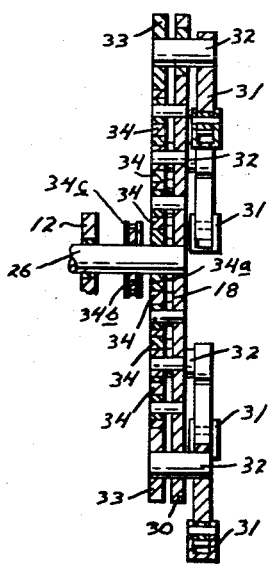
FIGURE 5 is a fragmentary sectional view on the line 5—5 of FIGURE 3.
Figure 4:
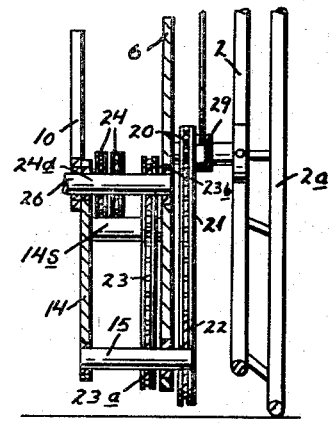
FIGURE 4 is a fragmentary sectional view taken on the line 4—4 of FIGURE 2.

The specific construction of the walking wheels will be better understood by reference to FIGURES 3–5 of the drawings. Each wheel 18 or 19 embodies a support member 30 having the drive shaft 26 or 28 fixed thereto. Each member 30 has a plurality of supporting feet 31 journalled thereon at equally spaced points about its periphery. These feet have shafts 32 extending through the member 30, and provided on the other side thereof with pinions 33. These pinions are controlled by planetary gearing 34 on the member 30 and members 10 and 12 arranged to keep the pinions 33 at a position which keeps all of the feet pointed down at every position of the member 30. The member 30 is cut away between the pinions 33 so that the feet 31 may engage a stair step without having the member 30 strike the stair corner. The feet 31 have enlarged lower ends which enable them to engage steps of various spacing.

The gearing 34 and its connections to the members 10 and 12 and the feet 31 must be such that the feet 31 cannot incline in a direction to tend to tip the chair down the steps. Since the rear climbing wheels 19 are at a higher level than the front climbing wheels 18 when they are climbing up or down, and the difference in level is variable depending upon the nature of the steps and whether both sets of wheels are on the steps or one set is just starting to climb, the pinions 33 must have connection through the gearing 34 to a center pinion 34a which does not turn because of changes in the respective levels of the front and rear climbing wheels. I therefore provide means to connect the pinions 34a to the upper ends of the links 14 and 16 which carry most of the chair load when climbing and will remain substantially vertical at all times. Any suitable connection means may be used. As an example, sprocket wheels 34b, 14b and 16b are provided. The sprocket wheels 34b are fixed to the pinions 34a and the sprocket wheels 14b and 16b are fixed to the respective links 14 and 16. Sprocket chains 34c connect these sprocket wheels. Also stops 14s and 16s are provided on the cab frame members 6 and 7 to prevent the links 14 and 16 from inclining forward from the bottom to top.

When it is desired to climb steps, the operator backs the chair toward the first step and uses the clutch 29 to engage the gearing so as to rotate the climbing wheels 18 and 19 when the wheels 2 are turned. This will cause feet 31 of the wheels 19 to engage the step and raise the rear end of the chassis frame members 10 and 12. The rollers 9 and 13 lift up on the channelled rails 8 and 11 and this rotates the chassis frame members 10 and 12 with respect to the cab frame members 6 and 7, thus causing a lowering of the front climbing wheels 18 with respect to the wheels 2 as the chassis frame members 10 and 12 rotate with respect to the cab frame 4. The rear climbing wheels 14 engage the steps and the climbing wheels 18 and 19 take the load from the wheels 2 and 3.

Figure 11:
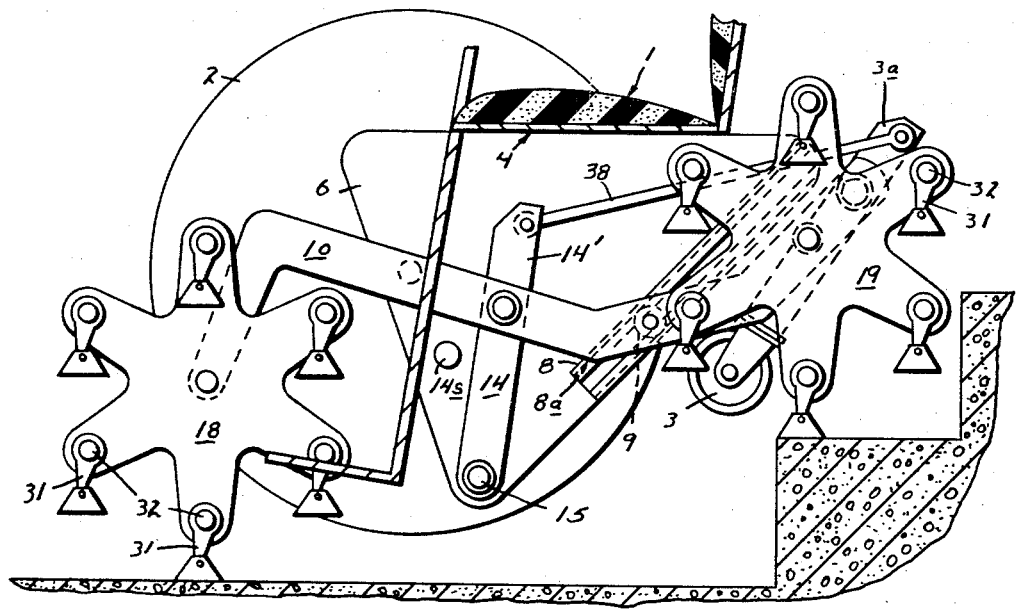
FIGURE 11 is a view similar to FIGURE 7 showing another preferred arrangement of the parts for controlling the transfer of the chair load between the caster wheels and the climbing wheels.
Figure 12:
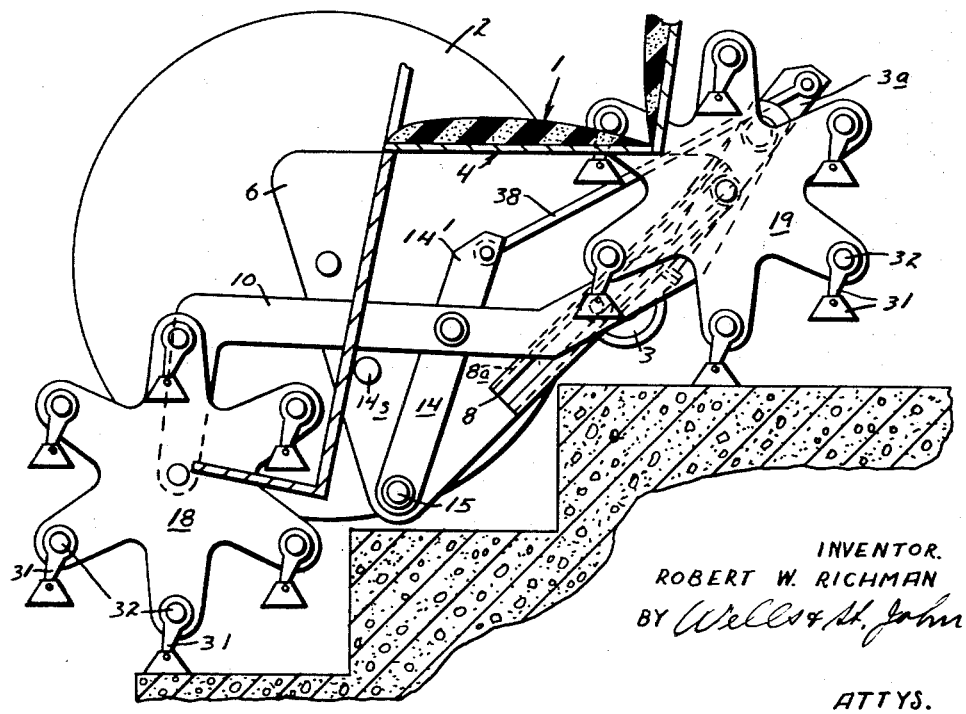
FIGURE 12 is a further view of the mechanism shown in FIGURE 11 illustrating the relation of the parts as the chair moves from a stairway to a level area.

The caster wheels 3 can then be moved forwardly and upwardly automatically by the arrangement shown in FIGURES 11 and 12 or under manual control by means of levers 37 which are connected by links 35 to the support stems 3a. The levers 37 are fixed to a shaft 37a pivoted on the side frames 6 and 7. Normally the stems 3a are inclined slightly toward the rear from top to bottom and are biased to this position by springs 36 extending from the side frame members 6 or 7 to the upper ends of the stems 3a which extend above their connection to the chassis frame members 10 and 12. The levers 37 are extended up to where they can be actuated by the operator and latch means 37b is provided to hold levers 37 in position to lock the caster wheels 3 in their lowered positions where they support the rear ends of members 10 and 12 or in their forward positions out of the way of the steps while the chair is climbing the steps. The levers 37 are connected to the clutches 29 by links 37c so as to release the clutches when the caster wheels 3 are lowered.

As the wheels 18 and 19 are driven, they move the chair up or down the steps. The structure is so designed that the center of gravity of the chair cab and its load is always rearwardly of the support engaging feet 31 of the wheels 18 in normal stair climbing. This must be done in order to prevent forward tipping of the chair. At the top of the steps the climbing wheels 19 move along the level surface until the wheels 18 reach this level. In this position the cab frame 4 inclines rearwardly. The operator then uses the levers 37 to move the caster wheels 3 back into original position and in so doing the caster wheels 3 take the load and the rear climbing wheels are raised clear of the surface and the cab frame 4 returns to level position. The rollers 9 and 13 lift up on the rear portions of the cab frame members 6 and 7, causing them to tip the chair frame back to level position and thus lower the wheels 2 with respect to the wheels 18, thus completing the transfer of load to the wheels 2 and 3.

When the mechanism shown in FIGURES 11 and 12 is used the lever 37 and its connections are not needed. The links 14 and 16 are extended beyond the chassis frame members 10 and 12 upwardly as shown at 14′ and 16′ and the upper ends of caster wheel stems 3a are connected to these extensions 14′ and 16′ by links 38. Since the links 14 and 16 and the stems 3a are pivoted on the chassis frame members 10 and 12 at fixed distances apart a leverage arrangement is provided whereby the stems 3a always move angularly in response to angular movement of the links 14 and 16. Thus as illustrated by FIGURE 11 when a step is approached from a level surface below it and the clutch 29 is operated to start the climbing wheels to turning the first action of the rear climbing wheels 19 is to engage the step and lift the rear ends of the members 10 and 12. This immediately changes the angles of the links 14 and 16 with respect to the machines 11 and 12 to cause the links 38 to swing the stems 3a in a direction to move the caster wheels 3 away from the step and upward. The operator also by continuing to turn the wheels 2, causes the front climbing wheels 18 to be lowered with respect to the wheels 2 to take the load from the wheels 2 and the rear climbing wheels 19 to rise more and thus tilt the chassis frame members 11 and 12 to where the wheels 2 and 3 do not touch the steps.

At the top of a series of steps the position shown in FIGURE 12 is reached where the climbing wheels 19 lower the rear ends of the chassis frame members 10 and 12 until the caster wheels 3 engage the level surface. Further advance of the chair rearwardly lifts the front ends of the members 10 and 12 with respect to the rear ends thereof and further lowers the wheels 2 with respect to the climbing wheels 18 until the wheels 2 take the load from the climbing wheels 18. The showing in FIGURE 12 illustrates the wheels 2 just reaching the surface at the top of the stairs. The clutch 29 can remain in position to drive the climbing wheels until the chair is moved away from the steps so it is always safe. Even if the clutch 29 is released before the wheels 2 are entirely clear of the steps the chair cannot run away down the steps because the load is automatically transferred to the climbing wheels as the chassis frame members tip and these climbing wheels cannot turn unless power is supplied to the worm 2b.

The frame 4 is supported, when the climbing wheels 18 and 19 are down, by the connection of the side frames 6 and 7 to the links 14 and 17 and the rollers 9 and 13.

Thus in stair climbing position, the tendency is for the links 14 and 16 to remain vertical because the load is suspended on them. The natural tendency is for the rollers 9 and 13 to move up their respective rails 8 and 11 due to the load on them. The result is that some forward component of force is always transmitted to the frame members 6 and 7 by the rollers 9 and 13 and this force tends to cause a forward shifting of the lower ends of the links 14 and 16 with respect to their upper ends. It is not enough, however, to cause any substantial inclination. The connection of the feet 31 to the links 14 and 16 is also such that when these feet are climbing stairs the load on them tends to bias the links 14, 16 toward the stops 14s and 16s respectively.

When the cab frame load is suspended upon the links 14 and 16 this is sufficient to maintain the links substantially vertical. When the cab frame load is shifted to the wheels 2 and 3 then the weight of the wheels 18 and the front portions of the chassis frame members 10 and 12 is transmitted through the links 14 and 16 to the cab frame members 6 and 7 at the shafts 15 and 17. The only way in which the links 14 and 16 can move forwardly or rearwardly under this condition is for the rollers 9 and 13 and the frames 10 and 12 to move forwardly or rearwardly with respect to the shafts 15 and 17. Forward movement of these parts is prevented by the stops 14s and 16s. Rearward movement is possible only if the rollers 9 and 13 and the frames 10 and 12 can move rearwardly with respect to the shafts 15 and 17. For this to occur, the rear ends of the cab frame members 6 and 7 must drop, but the wheel stems 3a opposite this. They are inclined from the wheels 3 forwardly to where they connect to the chassis members 10 and 12. The links 35 and the levers 37 and latch means 37b hold the stems 3a in this position. Any drop of the rear ends of the members 6 and 7 must increase the distance from the stems 3a to the shafts 15 and 17 and this cannot be done because of the links 35 and levers 37.

The forward inclination of the cab frame 4 is limited by providing the rails 8 and 11 with channels 8a and 11a, in which the rollers 9 and 13 must travel. Any forward tilt of the cab frame 4 tends to lift the rollers 9 and 13, which in turn tend to lift the rear climbing wheels 19 or the wheels 3. So long as the center of gravity is kept rearwardly of the feet 31 of the front wheels 18 and rearwardly of the axes of the wheels 2, the forward tilt is ineffective to tip the chair forward. Any attempt to tilt the chair forward merely results in an attempt to lift the entire weight. The chair cannot have free downward motion on a series of steps when carried by the climbing wheels 18 and 19 because these wheels are prevented from turning by the worm gear drives 2b–2c unless the worms 2b are rotated by turning of the wheels 2.

It is believed that the nature and advantages of my invention will be clear from the foregoing description.

Having thus described my invention, I claim:

1. A vehicle with climbing wheels for going up and down terraced inclines, which comprises in combination;
   a cab frame having upstanding spaced side frame members provided with supporting wheels;
   a chassis frame member alongside each side frame member and extending forwardly and rearwardly therebeyond;
   climbing wheels journalled on the front and rear ends of each chassis frame member and provided with step engaging feet;
   means interconnecting the said chassis frame members with the cab frame operable to raise and lower said chassis frame members with respect to the cab frame to bring either the supporting wheels or the climbing wheels into position to support said cab frame;
   said interconnecting means including an upright link extending from each side frame member to the corresponding chassis frame member and pivoted to both of them;
   a roller on each chassis frame member spaced endwise thereof from the point where the link is pivoted thereto; and
   a channelled rail on each cab frame member inclined upward away from the pivotal connection of the link to the cab frame member in which said roller rides.

2. A vehicle operable on wheels for travel on the level and provided with means to climb up and down terraced inclines, said vehicle comprising:
   a cab frame having upstanding spaced side frame members provided with front supporting wheels;
   a chassis frame member alongside each side frame member;
   rear caster wheels for said chassis frame members;
   climbing wheels on the front and rear end portions of each chassis frame member and provided with step engaging feet operable to raise and lower the ends of the chassis frame members from one step to another upon rotation of said climbing wheels;
   means interconnecting the chassis frame members with the cab frame for transmitting the vehicle load to the chassis frame members; and means effective upon engagement of said climbing wheels with steps, to raise the caster wheels with respect to the rear climbing wheel and thereby bring the climbing wheels into vehicle load carrying position.

3. The device defined in claim 2 with drive means interconnecting the climbing wheels with said front supporting wheels.

4. The device defined in claim 2 wherein the supporting wheels have annular hand rails thereon for turning them and the climbing wheels are connected to the hand rails by reduction gearing and a clutch; and
   the reduction gearing includes means operable to prevent turning of the climbing wheels except by transmission of power from the hand rails.

5. The device defined in claim 2 wherein said means interconnecting the chassis frame members with the cab frame includes a link pivoted to each side frame member and extending upwardly and pivotally secured to the adjacent chassis frame member.

6. The device defined in claim 5 in which the links are connected to the caster wheels to cause the caster wheels to move angularly in response to pivoting of the links on their chassis frame members.

References Cited
UNITED STATES PATENTS

| | | | |
|---|---|---|---|
| 3,111,331 | 11/1963 | Locke | 280—5.22 |
| 3,133,742 | 5/1964 | Richison et al. | 280—5.28 |
| 3,191,953 | 6/1965 | Aysta | 280—5.22 |
| 3,196,970 | 7/1965 | Brenner | 180—8 |
| 3,214,184 | 10/1965 | Kemm | 280—5.26 |
| 3,241,848 | 3/1966 | Flory | 280—5.26 |

LEO FRIAGLIA, *Primary Examiner.*